US009014042B2

(12) United States Patent
Fraboulet et al.

(10) Patent No.: US 9,014,042 B2
(45) Date of Patent: Apr. 21, 2015

(54) SYSTEM AND METHOD FOR DISCOVERING SURROUNDINGS FOR COMMUNICATING OBJECTS

(75) Inventors: Antoine Fraboulet, Lyons (FR); Eric Fleury, Lyons (FR); Guillaume Chelius, Villeurbanne (FR)

(73) Assignees: Institut National des Sciences Appliquees de Lyon, Villeurbanne (FR); Institut National de Recherche en Informatique et en Automatique, Rocquencourt (FR); Ecole Normale Superieure de Lyon, Lyons (FR); Universite Claude Bernard Lyon I, Valleurbanne (FR); Centre National de la Recherche Scientifique (CNRS), Paris (FR)

( * ) Notice: Subject to any disclaimer, the term of this patent is extended or adjusted under 35 U.S.C. 154(b) by 0 days.

(21) Appl. No.: 13/882,985

(22) PCT Filed: Oct. 28, 2011

(86) PCT No.: PCT/EP2011/069023
§ 371 (c)(1),
(2), (4) Date: Jul. 22, 2013

(87) PCT Pub. No.: WO2012/059434
PCT Pub. Date: May 10, 2012

(65) Prior Publication Data
US 2013/0286897 A1    Oct. 31, 2013

(30) Foreign Application Priority Data

Nov. 3, 2010   (FR) ..................................... 10 59043

(51) Int. Cl.
| H04L 12/26 | (2006.01) |
| H04L 12/24 | (2006.01) |
| H04W 52/02 | (2009.01) |
| H04W 8/00 | (2009.01) |
| H04W 74/08 | (2009.01) |

(52) U.S. Cl.
CPC ............... *H04L 41/12* (2013.01); *H04W 8/005* (2013.01); *H04W 52/0216* (2013.01); *H04W 74/085* (2013.01)

(58) Field of Classification Search
CPC ... H04L 12/403; H04L 43/00; H04L 43/0852; H04B 7/155; H04B 7/2606; H04W 88/06
USPC ......... 370/208, 210, 216, 217, 221, 241, 252, 370/286, 328, 341, 345, 389; 455/403, 434, 455/454, 63.12
See application file for complete search history.

(56) References Cited

U.S. PATENT DOCUMENTS 6,477,140 B1 *  11/2002  Uda et al. ...................... 370/216
8,086,232 B2 *  12/2011  Krishnan ...................... 455/434

(Continued)

OTHER PUBLICATIONS

Clausen, L., et al., "Mobile Ad Hoc Network (MANET) Neighborhood Discovery Protocol (NHDP); draft-ietf-manet-nhdp-14.txt", *Mobile Ad Hoc Network (MANET) Neighhorhood Discovery Protocol (NGHP), Draft-IETF-MANET-NHDP-14.txt, Internet Engineering Task Force, IETF, Standardworkingdraft, Internet Society (ISOC)* 4, Geneva, Switzerland, No. 14; Jul. 12, 2010; pp. 1-86, XP015070023.

(Continued)

*Primary Examiner* — Raj Jain
(74) *Attorney, Agent, or Firm* — Blakely Sokoloff Taylor & Zafman

(57) ABSTRACT

The invention relates to a system for determining surroundings in a wireless network, the system including first and second nodes, each node being programmed to periodically detect the nodes located in the surroundings thereof every time period Δ, characterized in that: the first node comprises a transmitter (1) and control means (3) for activating the transmitter (1) for a transmission time ξ less than the time period Δ, the transmitter transmitting an identification signal during the transmission time ξ; the second node comprises a receiver (2) and control means (3) for activating the receiver (2) for a reception time α less than the time period Δ, the receiver (2) listening for the signals from the adjacent nodes during the reception time a, the control means (3) of the second node activating the receiver once per time period Δ.

11 Claims, 2 Drawing Sheets

(56) References Cited

U.S. PATENT DOCUMENTS

| | | |
|---|---|---|
| 2006/0193274 A1 | 8/2006 | Yamagata |
| 2008/0031210 A1 | 2/2008 | Abhishek et al. |
| 2008/0186907 A1* | 8/2008 | Yagyuu et al. ............... 370/328 |
| 2010/0202302 A1* | 8/2010 | Cai et al. ...................... 370/252 |
| 2011/0150251 A1* | 6/2011 | Solum et al. ................. 381/314 |

* cited by examiner

SYSTEM AND METHOD FOR DISCOVERING SURROUNDINGS FOR COMMUNICATING OBJECTS

The present invention relates to the general technical field of asynchronous procedures for discovering surroundings—i.e. objects not having a global clock in common—for communicating objects.

Within the scope of the present invention, by "communicating object" is meant an object comprising a transmitter for transmitting a signal towards another communicating object and/or a receiver for receiving the signals transmitted by another communicating object.

In the case of two communicating objects, both communicating objects may be mobile or fixed—such as for example a telephone, a radiofrequency terminal either fixed or any other mobile or fixed terminal known to the person skilled in the art.

The invention finds fields of application as soon as communicating objects are used.

In the following, the terms of « node » and "object" will be equally used for designating communicating objects.

PRESENTATION OF THE PRIOR ART

The present invention relates to the discovery of surroundings by communicating objects: for a communicating object, the discovery of surroundings consists of discovering the whole of the objects present in its neighborhood (proximity/surroundings).

The notion of surroundings is directly related to the capability of communication of the objects. An object A is said to be a neighbor of B if A may receive information from B. It is interesting to note that the neighbor relationship is not necessarily reciprocal.

The discovery of surroundings for communicating objects may have several final purposes. This may be an elementary process required for applying other procedures or more complex services, such as for example a routing procedure or a procedure for discovering services. It may also be the actual goal of the application if, for example, it is the proximity of the objects which is sought to be measured.

In every case, the discovery of surroundings is a problem widely addressed in the field of single or multi-jump wireless communication networks, notably so-called "ad hoc" networks (also known under the acronym of "MANET" meaning "Mobile Ad-Hoc Networks"), networks of sensors (also known under the acronym of "WSN" meaning "Wireless Sensor Networks"), or further personal networks (also known under the acronym of "BANET" meaning "Body Area Networks"), etc.

In these fields, the discovery of surroundings is generally achieved by periodically sending a signal with period $\Delta$—for example a "Hello" packet—between the objects present on the network. More specifically, each communicating object comprises control means adapted for controlling the activation/deactivation of a transmitter and of a receiver of the object. The control means of the object periodically activate the transmitter for a transmission time $\tau$. During the time for activating transmission of the transmitter, the receiver is deactivated by the control means.

The period $\Delta$ is imposed by the application and corresponds to the period at which the mobile objects intend to evaluate/discover their surroundings. This period is related to the dynamics of the appearances and disappearances of the nodes of the network. For example, in the case of the detection of surroundings on the platform of a railway station, the period $\Delta$ will be shorter than in the case of detection of surroundings in a cinema where persons bearing the communicating objects remain in a same position for a longer time.

As illustrated in the diagram of FIG. 1, with the systems and methods of the prior art, when the transmitter TX of an object is deactivated—i.e., outside the transmission time $\tau$—the receiver RX is activated. In other words, when the object is not transmitting, it is receiving on its communication interface.

An object present on the network should therefore both announce its information and listen to information from its neighbors. This simple discovery mechanism is notably used within the scope of ad-hoc routing procedures and notably those standardized at the IETF.

A disadvantage of this protocol relates to the risks of collision which may occur if two neighboring objects decide to transmit their information simultaneously. Indeed, simultaneous transmission from two communicating objects at a same instant causes systematic collisions between the objects and a loss of the information transmitted by these two objects.

In order to avoid these collisions, a random shift $\delta$ (also known under the name of "jitter") is generally added to the inter-transmission period, as illustrated in FIG. 2. In other words, two successive activations of the transmitter by the control means are spaced out in time by a period $\Delta$ plus a random shift $\delta$.

A drawback of these procedures illustrated in FIGS. 1 and 2 is that they consume a lot of energy.

An object of the present invention is to propose a system and a method for discovering surroundings allowing limitation of the energy consumed by the mobile objects.

SUMMARY OF THE INVENTION

For this purpose, the invention proposes a system for determining surroundings in a wireless network, the system comprising first and second nodes, each node being programmed in order to periodically detect the nodes located in its surroundings every time period $\Delta$, remarkable in that the first node includes a transmitter and control means for activating the transmitter for a transmission time $\tau$ less than the time period $\Delta$, the transmitter transmitting an identification signal during the transmission time $\tau$;

the second node includes a receiver and control means for activating the receiver for a receiving period $\alpha$ less than the difference between the time period $\Delta$ and the transmission time $\tau$, the receiver listening to the signals from the neighboring nodes during the receiving period $\alpha$, the control means of the second node activating the receiver only once per time period $\Delta$.

Advantageously, the nodes may be mobile or fixed. For example, a node may be mobile and the other one fixed, both nodes may be mobile or both nodes may be fixed.

The use of the system above in an environment of fixed objects makes sense and corresponds to the discovery of surroundings used in problems of the "auto-configuration" type (automatic configuration of a network or of a set of machines). An exemplary application relates to the setting into place of a common time reference system if a machine is taken as a time reference. The fixed objects may also have discontinuous or non-permanent operation, without however moving, causing the necessity of setting into place a dynamic measurement of surroundings in order to know who is present at a given moment in the network.

Preferred but non-limiting aspects of the system according to invention are the following:

the control means of the first node are adapted so as to activate the transmitter several times over the time period Δ, the transmitter transmitting an identification signal "Hello" at each activation;

the receiving duration α is less than twice the inter-transmission duration 2σ between two successive transmissions of the transmitter, and is greater than or equal to the sum of the transmission duration τ and of the inter-transmission duration σ between two successive transmissions of the transmitter over a same period Δ;

the receiving duration α is equal to the sum of the transmission duration τ and of the duration between two successive transmissions of the transmitter over a same period Δ;

the step between two successive activations of the transmitter is equal to the sum:
of the transmission duration τ,
of the inter-transmission duration σ separating two successive activated states on the transmitter and
of a time shift δ of less than the time period Δ;

the duration of the time shift is random;

each node comprises a filter in order to only take into account one single identification signal per neighboring node per period.

The invention also relates to a method for determining surroundings in a wireless network including first and second nodes, each node being programmed in order to periodically detect the nodes located in its surroundings every time period Δ, remarkable in that it comprises the activation of a transmitter of the first node for a transmission time τ less than the time period Δ, the transmitter transmitting an identification signal during the transmission time τ;

the activation of a receiver of the second node for a receiving period α of less than the time period Δ, the receiver listening to the signals from neighboring nodes during the receiving period α, the receiver being activated only once per time period Δ.

Advantageously, the method may comprise several steps for activating the transmitter over a time period Δ, the transmitter transmitting an identification signal at each activation.

The invention also relates to a computer program product including a program code recorded on a computer-legible data medium in order to execute the method described above when the computer program is applied to a computer in order to be executed.

BRIEF DESCRIPTION OF THE DRAWINGS

Other advantages and characteristics will be become better apparent from the description which follows of several alternative embodiments, given as non-limiting examples, from the appended drawings wherein.

DETAILED DESCRIPTION OF THE INVENTION

Figure 3:
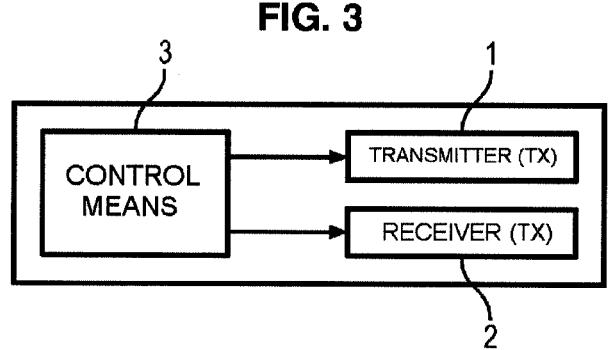
FIG. 3 schematically illustrates an exemplary communicating object.

With reference to FIG. 3, an exemplary communicating object is illustrated. This communicating object comprises a transmitter 1 capable of transmitting a signal, a receiver 2 capable of receiving the signal(s) transmitted by other communicating objects and control means 3 for activating/deactivating the transmitter 1 and the receiver 2 of the communicating object.

An object of the invention relates to the asynchronous discovery of surroundings for a mobile communicating object inducing low energy consumption and minimizing interferences.

The terms used in the previous paragraph are defined below:

discovery of surroundings: a communicating object should discover around it the objects with which it may communicate;

asynchronous: the objects do not have a common time reference system: the discovery cannot therefore be based on a common time notion;

mobile object: an object may enter and leave a network (discontinuous operating mode). The discovery process is therefore a dynamic and time-continuous process which should allow detection of events such as the arrival or the disappearance of neighbors;

low energy consumption: the objects are generally constrained and self-contained from an energy point of view. The procedure should therefore minimize energy consumption of the objects;

minimization of the interferences: the communication interfaces of the objects are constrained. The procedure should therefore seek to minimize the use of the communication channel and the interferences which it generates.

As mentioned above, a drawback of the existing procedures for discovery of surroundings relates to the energy consumption.

This is due to the fact that the communication interfaces permanently remain in a receiving mode for listening to the announcements from the neighbors. Indeed, radio interfaces in their present technology consume the same amount of energy for listening to the medium regardless of the activity on the latter.

Figure 4:
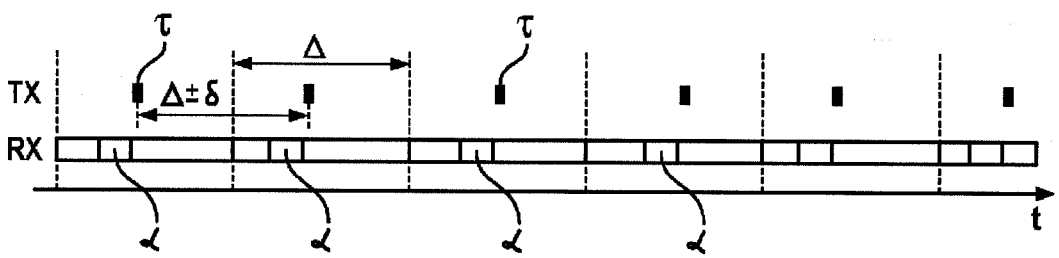
FIGS. 4 to 6 schematically illustrate different examples of methods relating to the discovery of surroundings for a communicating object.

With reference to FIG. 4, an exemplary method is illustrated, allowing reduction in the energy consumption of the communicating objects.

In this embodiment, each communicating object is programmed in order to periodically discover its surroundings every period Δ. During a period Δ, the control means 3 activate the transmitter 1 of the object once for a transmission time τ during which an identification signal—for example "Hello"—is sent to the attention of the other communicating objects of the network. At the end of the transmission time τ, the control means 3 deactivate the transmitter 1. As regards the receiver 2 of the object, the latter is activated by control means 3 during a receiving period α. Advantageously, the receiver 2 is only activated once per period Δ.

Figure 1:
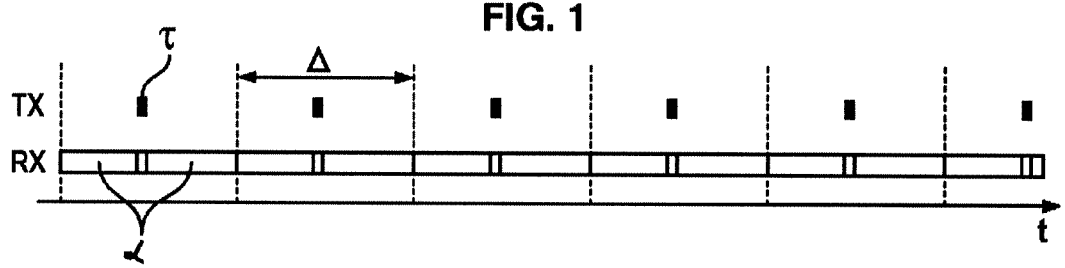
FIGS. 1 and 2 illustrate methods of the prior art relating to the discovery of surroundings for communicating objects.
Figure 2:
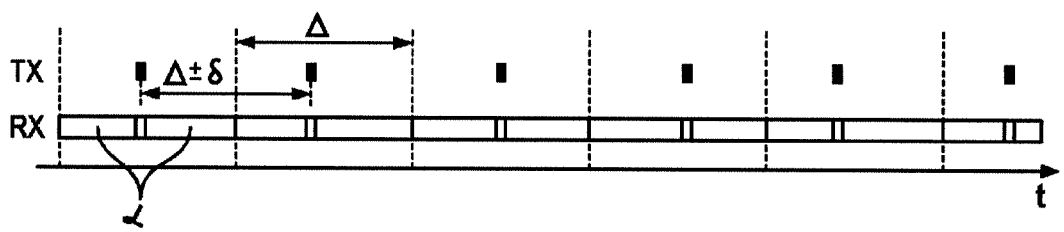

It will be noted that in the case of the methods illustrated in FIGS. 1 and 2, the receiver 2 is permanently activated when the transmitter 1 is deactivated, so that the receiving period α of the receiver 2 is equal to the difference between the time period Δ and the transmission duration τ.

On the other hand, in the embodiment illustrated in FIG. 4, inactivity phases of the receiver 2 are set into place during the period Δ, these inactivity phases including instants at which the transmitter 1 is inactive. Thus, over a period of time Δ, the receiving period α is less than the difference between the period Δ and the transmission time τ, and preferentially less than half the period Δ.

By reducing the time during which the receiver 2 is active over a period Δ, this embodiment allows reduction of the energy consumed by the receiver 2 and therefore by the communicating object.

As the objects are not synchronized, the time difference between two activations of the transmitter 1 and the time difference between two activations of the receiver 2 are generally selected randomly. The discovery process then becomes stochastic and a neighbor is only discovered if its transmission coincides in time with the receiving period of the neighboring object. This discovery mechanism therefore allows considerable reduction in the energy consumption at the expense of a significant loss of the accuracy in discovering the surroundings.

In order to improve the accuracy in the discovery of the surroundings while reducing the energy consumption, an embodiment is proposed in which, over a period Δ, the frequency of the announcements is increased—i.e. the control means activate several times the transmitter over a same period Δ—in order to maximize the receiving probability of these announcements by a neighbor.

The principle consisting of limiting the listening time of each object is retained for optimizing the energy consumption.

Figure 5:
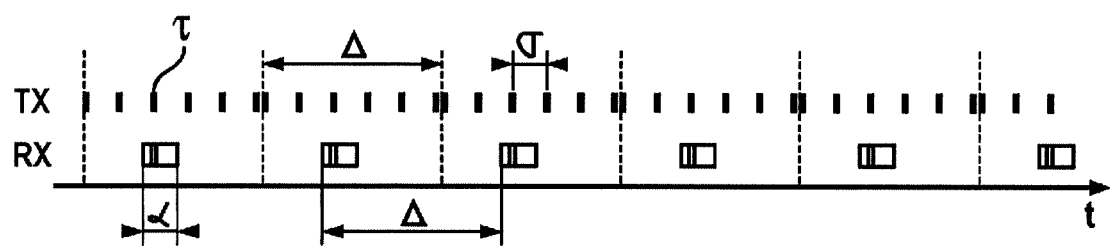
Figure 6:
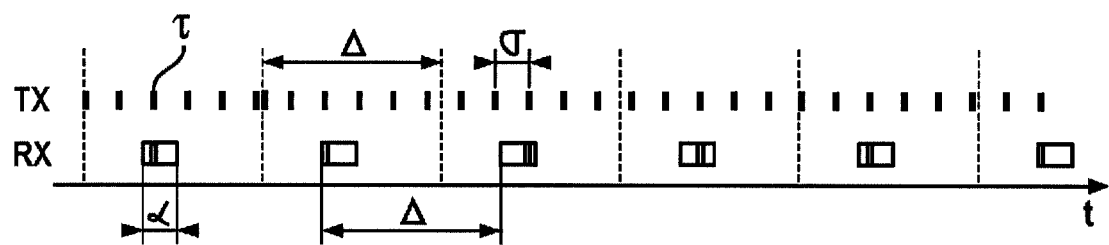

FIGS. 5 and 6 illustrate the main parameters set into place for the invention.

Each object periodically searches for its neighbors with period Δ. The receiver 2 is activated only once per period Δ for a receiving period α. The transmitter 2 as for it is activated several times by the control means 3 over a same period Δ. Upon each activation, the transmitter 1 transmits an identification signal for the transmission time τ.

Preferably, the receiving period α is greater than or equal to the sum of the transmission time τ and of the inter-transmission period σ separating two successive activated states of the transmitter. With this it is possible to guarantee that the receiver of an object receives the message transmitted by the transmitter from a neighboring object during one period. The person skilled in the art will have understood that the inter-transmission period corresponds to the time difference separating two successive transmissions by the transmitter, i.e. to the period during which the transmitter is deactivated by the control means between two successive activations.

It will be noted that when the receiving period α is selected to be equal to the sum of the transmission time τ and of the inter-transmission period σ, the energy consumption at the communicating object is a minimum.

In order to substantially minimize the energy consumption in the communicating object while maximizing the probability of discovery of a neighbor, the receiving period α is preferentially comprised between twice the inter-transmission period 2σ and the sum of the transmission period τ and of the inter-transmission period σ between two successive activations of the transmitter over a same period Δ:

$$2\sigma \geq \alpha \geq \tau + \sigma.$$

The collision and interference probability increases with the density of the surroundings. Several objects may attempt to send their information simultaneously.

Advantageously, the step between two successive activations of the transmitter may be equal to the sum:
- of the transmission time τ
- of the inter-transmission period σ separating two successive activated states of the transmitter and
- of a time shift δ (or "jitter") of less than the time period Δ.

The use of a random jitter particular to each object, δ between two transmissions gives the possibility of shifting the packets and therefore limiting the risks of collision and interferences between the objects.

In order to avoid detecting several times the same neighboring object during a same time period Δ, each object may comprise a filter in order to only take into account a single announcement from a neighboring object per period. Indeed, as the receiving period α may be greater than the inter-transmission period σ of the announcements, several announcements from a same neighboring object may be received during the receiving period α.

In the embodiment illustrated in FIG. 5, the transmitter 1 and the receiver 2 are synchronized relatively to each other. Thus, the instants for activating and deactivating the transmitter and the receiver are identical in each period Δ.

In the embodiment of FIG. 6, the transmitter and the receiver are desynchronized relatively to each other. The activation and deactivation instants of the transmitter vary from one period Δ to the other.

As explained earlier, the invention is based on a set of parameters for handling the transmission and receiving times of the objects giving the possibility of varying in a wide range the operating mode of the procedure for discovering the surroundings and thus of being able to set into place a compromise between the energy costs and the discovery accuracy, adapted according to the targeted application.

The parameters used are the following:
- Δ: macro-period for discovering the surroundings, this period is related to the application and corresponds to the period at which the object or mobile node intends to evaluate/discover its surroundings. This period is related to the dynamicity of the appearances and disappearances of the objects of the network;
- σ: inter-transmission period of the identification signal ("Hello" packets) corresponding to the time during which the transmitter is in a deactivated mode;
- τ: transmission time for the identification signal (i.e., a "Hello" packet) corresponding to the time during which the transmitter is an activated mode;
- α: reception period corresponding to the listening time on the medium, i.e. to the time during which the receiver is in an activated mode;
- δ: shift allowing desynchronization of the transmission of two neighboring objects, this parameter is used for reducing systematic collisions.

Each object in the network has its own clock, the objects are not synchronized neither upon initialization nor upon use of the system. Each node is responsible for managing its internal time. The network activity of an object in the phase for discovering the surroundings is shared between a listening time and announcements of information. The information announcements are packets for which the transmission time is equal to a duration τ. The macro period Δ for calculating the surroundings includes announcements and a listening period of duration α. The duration α is a reference duration, greater than the inter-transmission period σ of the announcements plus τ so that:

$$\Delta > \alpha > \sigma \qquad (1)$$

The parameters related to the implantation of the procedure for discovering the surroundings are:

$$A = \frac{\sigma}{\alpha}, 0 < A \leq 1 \qquad (2)$$

-continued $$B = \frac{\sigma}{\Delta}, 0 < B \le 1 \qquad (3)$$

Wherein:
A represents the ratio between the inter-transmission time and the listening window of the procedure. This ratio is used for managing the density parameters in the surroundings as well as the interferences between the different objects;
B represents the ratio between the listening time and the macro period. This ratio represents the energy reduction factor as compared with the version where listening is permanent.

The parameters A and B are not independent and are related to the variable σ. They are mentioned here explicitly for the sake of clarity of the presentation. The energy consumption of the procedure may be easily modeled. The activation time of the transmitter, a state in which consumption is the most significant, is given for a macro period by the following relationships:

$$E_{TX} = P_{TX} \times \tau \times \left[\frac{\Delta}{\sigma + \tau}\right] \qquad (4)$$

$$E_{RX} = P_{RX} \times \left(\alpha - \left[\frac{\alpha}{\sigma + \tau}\right] \times \tau\right) \qquad (5)$$

PTX and PRX are the powers consumed by the radio associated with the transmissions and with the reception of the packets. The numerical applications on usual equipment and timings show that the parameters of the procedure for discovering the surroundings allow optimization and minimization of the energy consumption for the applications.

The procedure for discovering the surroundings, described above, may be implanted either in the form of an automaton (a state machine) delayed with a single time counter, either in the form of two competitive tasks (process, thread) accessing the transmitter and the receiver of the object:
the task for listening and measuring the surroundings controlling the time for listening to the medium is illustrated by a periodic task of period Δ listening to the medium for a period α;
the task handling the transmissions is a periodic task of period σ+τ: this task has priority and may send a message in the middle of a listening period triggered by the first task.

Both competitive tasks, the operation of which is illustrated in FIG. 6 give the possibility of properly implanting the procedure for discovery of the surroundings in a simple way.

An implantation in the master-slave form may easily be set into place in order to handle a specific synchronization mode of a distributed system. A particular node of the system is used as a time reference, its "Hello" packets containing a countdown counter, in time or in the number of packets, announcing the remaining time before the next macro-period Δ. This synchronization mode allows all the nodes present in the surroundings to be synchronized at the beginning of the next macro-period Δ. The inaccuracy of the synchronization system is only related to the variations in the propagation time of the message on the radio medium according to the distances of the nodes which are listening relatively to the master node. This time is negligible, or even not measurable, in present mobile architectures.

The person skilled in the art will have understood that many modifications may be made to the method and system described above without materially departing from the novel teachings shown here.

For example, the reader will appreciate that the system and the method described above are not limited to the detection of two communicating objects, and that it may be applied in the case of "n" communicating objects, n being an integer greater than two. Moreover, the communicating objects may communicate by using different types of signals. For example, the signals transmitted and received by the objects may be radiofrequency signals or infra-red signals or any other type of signals known to the person skilled in the art allowing application of wireless communication between the objects.

Therefore it is quite obvious that the examples which have been given are only particular illustrations and are by no means limiting.

The invention claimed is:

1. A system for determining the surroundings in a wireless asynchronous network, the system comprising first and second asynchronous nodes, each node being programmed for periodically detecting the nodes located in its surroundings every time period Δ,
wherein;
the first node includes a transmitter and a controller for periodically activating the transmitter for a transmission time τ, less than the time period Δ, the transmitter transmitting an identification signal during a transmission time τ;
the second node includes a receiver and a controller for periodically activating the receiver for a receiving period α less than the interval between the time period Δ and the transmission time τ, the receiver listening to the signals from neighboring nodes during the receiving period α, the controller of the second node activating the receiver only once per the time period Δ; and
at least one of a time difference between two activations of the transmitter and a time difference between two activations of the receiver is selected randomly for each node.

2. The system according to claim 1, wherein the controller of the first node is adapted for activating the transmitter several times over the time period Δ with an inter transmission period σ, the transmitter transmitting an identification signal "Hello" at each activation.

3. The system according to claim 2, wherein the receiving period α is less than twice the inter-transmission period σ between two successive transmissions of the transmitter over the time period Δ and is greater than or equal to the sum of the transmission period τ and of the inter-transmission period σ between two successive transmissions of the transmitter over a same period Δ.

4. The system according to claim 2, wherein the receiving period α is equal to the sum of the transmission period τ and of the inter-transmission period σ between two successive transmissions of the transmitter over the time period Δ.

5. The system according to claim 1, wherein the step between two successive activations of the transmitter of a node is equal to the sum:

τ+σ'+δ where
τ is the transmission time,
σ' is a given inter-transmission period for the system and
δ is a time shift δ being less than the time period Δ.

6. The system according to claim 5, wherein the time shift duration δ is a random jitter particular to each node.

7. The system according to claim 1 wherein each node comprises a filter in order to only take into account a single identification signal per neighboring node per period.

8. A method for determining the surroundings in a wireless network including first and second nodes, each node being programmed for periodically detecting the nodes located in its surroundings every time period Δ,
the method comprising the steps of:
- activating a transmitter of the first node during a transmission period τ less than the time period Δ, the transmitter transmitting a notification signal during the transmission period τ,
- activating a receiver of the second node for a receiving period α less than the time period Δ, the receiver listening to the signals from the neighboring nodes during the receiving period α, the receiver being activated only once per time period Δ, and
- at least one of a time difference between two activations of the transmitter and a time difference between two activations of the receiver is selected randomly for each node.

9. The method according to claim 8, which comprises several steps for activating the transmitter over the time period Δ, the transmitter transmitting an identification signal at each activation.

10. A computer readable data medium with a program code recorded thereon for determining the surroundings in a wireless network including first and second nodes when the computer program is executed by a computer, each node being programmed for periodically detecting the nodes located in its surroundings every time period Δ, comprising:
- activating a transmitter of the first node during a transmission period τ less than the time period Δ, the transmitter transmitting a notification signal during the transmission period τ,
- activating a receiver of the second node for a receiving period α less than the time period Δ, the receiver listening to the signals from the neighboring nodes during the receiving period α, the receiver being activated only once per time period Δ, and
- at least one of a time difference between two activations of the transmitter and a time difference between two activations of the receiver is selected randomly for each node.

11. The computer readable data medium according to claim 10, the computer program activates the transmitter over the time period Δ with an inter-transmission period σ, the transmitter transmitting an identification signal at each activation.

* * * * *